(12) United States Patent
Simon

(10) Patent No.: US 8,615,357 B2
(45) Date of Patent: Dec. 24, 2013

(54) METHOD FOR ASSISTING A USER OF A VEHICLE, CONTROL DEVICE FOR A DRIVER-ASSISTANCE SYSTEM OF A VEHICLE AND VEHICLE HAVING SUCH A CONTROL DEVICE

(75) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 12/735,365

(22) PCT Filed: Nov. 11, 2008

(86) PCT No.: PCT/EP2008/065303
§ 371 (c)(1),
(2), (4) Date: Sep. 29, 2010

(87) PCT Pub. No.: WO2009/106162
PCT Pub. Date: Sep. 3, 2009

(65) Prior Publication Data
US 2011/0010094 A1    Jan. 13, 2011

(30) Foreign Application Priority Data
Feb. 26, 2008   (DE) .......................... 10 2008 011 228

(51) Int. Cl.
*G08G 1/16*    (2006.01)
(52) U.S. Cl.
USPC .............. 701/301; 701/96; 340/435; 340/903
(58) Field of Classification Search
USPC .............. 701/301, 300, 96, 78; 340/903, 901, 340/435–437, 425.5; 180/167, 169, 170, 180/179; 348/116, 117, 148; 342/455, 118, 342/70, 71; 315/134, 129; 303/121; 367/909
See application file for complete search history.

(56) References Cited

U.S. PATENT DOCUMENTS

| | | | | |
|---|---|---|---|---|
| 5,234,070 A | * | 8/1993 | Noah et al. ..................... | 180/169 |
| 5,309,137 A | * | 5/1994 | Kajiwara ....................... | 340/436 |
| 6,491,420 B1 | * | 12/2002 | Scifres .......................... | 362/553 |
| 7,103,464 B2 | * | 9/2006 | Zielke ............................. | 701/70 |
| 2007/0242337 A1 | * | 10/2007 | Bradley ......................... | 359/237 |

FOREIGN PATENT DOCUMENTS

| | | |
|---|---|---|
| DE | 197 43 726 | 4/1998 |
| DE | 102 38 215 | 12/2003 |
| DE | 10 2004 056 426 | 5/2006 |
| EP | 1 024 050 | 8/2000 |
| EP | 1 095 833 | 5/2001 |
| WO | WO 2005/023613 | 3/2005 |
| WO | WO 2007/070159 | 6/2007 |

* cited by examiner

*Primary Examiner* — Marthe Marc-Coleman
(74) *Attorney, Agent, or Firm* — Kenyon & Kenyon LLP

(57) ABSTRACT

A method for assisting a user of a vehicle, in which driving-condition variables (v, a, q, ω, n) are sensed or ascertained via sensors of the vehicle, and a camera of the vehicle covers a coverage area of a road scene at least in front of the vehicle and outputs image signals. Based on the image signals, it is determined whether a further vehicle which is outputting blinking signals is in the coverage area. As a function of the ascertained driving-condition variables (v, a, q, ω, n) of the vehicle and as a function of the determination as to whether other vehicles are indicating a change of direction, information signals, particularly warning signals, are able to be output to the user and/or an automatic driver-assistance control is able to be implemented in which control signals for interventions in a vehicle control for a longitudinal control and/or lateral control, especially a distance control, are output. In this context, in each case different possible control interventions are able to be ascertained and carried out. Furthermore, a corresponding control device and the vehicle thereby made possible are provided.

28 Claims, 4 Drawing Sheets

METHOD FOR ASSISTING A USER OF A VEHICLE, CONTROL DEVICE FOR A DRIVER-ASSISTANCE SYSTEM OF A VEHICLE AND VEHICLE HAVING SUCH A CONTROL DEVICE

BACKGROUND OF THE INVENTION

1. Field of the Invention

The present invention relates to a method for assisting a user of a vehicle, a control device for a driver-assistance system of a vehicle and a vehicle having such a control device.

2. Description of Related Art

Driver-assistance systems are used to ascertain the driving condition and the traffic situation of the host vehicle and to indicate dangerous situations and advantageous interventions in the driving condition to the driver and, if appropriate, to intervene in the driving condition automatically, as well.

In doing so, sensors of the vehicle for measuring the driving condition of the host vehicle such as velocity, acceleration, etc., and advantageously also driving-environment sensors for sensing the vehicle environment, particularly for sensing other road users and, optionally, the roadway, are utilized.

In particular, sensors for measuring distance and video cameras may be used as driving-environment sensors. In this context, at least one camera integrated in the vehicle covers a surrounding area of the host vehicle. It is thus possible to detect lane markings and traffic signs. In addition, pedestrians, other vehicles and further objects may be detected and classified to some extent, as well.

The published German Patent document 102 38 215 A1 describes a method and a device for driver information and/or reaction in response to departure from the traffic lane. In that case, the traffic lane is detected via an image sensor based on the type of lane marking forming the boundary and/or the type of traffic in the adjacent lane. In each instance, a warning signal may be output or a vehicle intervention may be carried out as reaction depending on the situation recognized.

Furthermore, distance control systems are familiar, in which the distance to a vehicle in front is ascertained and kept constant by automatic vehicle interventions.

With such detection of the traffic condition by sensing other road users and lane markings, reactions are already possible early on. For more complex traffic situations such as in the case of vehicles changing lanes and dangerous situations subsequently developing, such methods alone are often not sufficient; moreover, driving-dynamics interventions already predefined by the driver such as a setpoint acceleration of the vehicle, for example, may exacerbate the recognized danger risk.

SUMMARY OF THE INVENTION

According to the present invention, a road scene, at least in front of the vehicle, is covered by at least one camera of the vehicle according to the invention. Vehicles are ascertained in the road scene covered, the vehicles ascertained being checked to determine if they are outputting a flasher signal. Advantageously, it is further ascertained whether the detected vehicles are outputting a braking signal. Thus, possibly together with measuring signals from further driving-environment sensors, it is possible to ascertain the traffic situation.

Also included according to the present invention are driving-condition variables of the host vehicle, especially velocity, longitudinal and lateral acceleration and, for example, the yaw rate, wheel speed, wheel slip, slip angle, etc. According to the present invention, based on the ascertained instantaneous traffic situation and the altered traffic situation most likely subsequently setting in because of the ascertained directional signals, as well as the determined driving condition of the host vehicle, an information signal, particularly a warning signal may be output and/or a driver-assistance function with automatic intervention in the driving condition may be activated or adapted.

In the present invention, it is advantageously possible to differentiate between the output of a direction-change flasher signal by actuation of the turn-signal lights on one side and the output of a warning flasher signal by actuation of the turn-signal lights on both sides, so that different measures may be taken as a function of the result of this differentiation.

An intervention in the driving condition may be implemented automatically in response to the detection of a change-of-direction signal by a preceding vehicle in the lane of the host vehicle or perhaps in an adjacent lane; evasion possibilities in adjacent lanes may be determined to advantage based on the driving-environment sensors.

In particular, the method of the present invention may be employed in a distance-control system, e.g., ACC (adaptive cruise control). In this context, distance in particular may be controlled, e.g., using an autonomous cruise control system, in consideration of the camera images and the possibly occurring dangers ascertained from them.

The invention is based on the idea that it may be that, by way of the driving-environment sensors or environmental sensors of the vehicle, a conventional driver-assistance system is able to recognize the dangers occurring in the event of a lane change by a vehicle in front as soon as the lane change is completed or perhaps is initiated. However, upon recognition of the danger, especially the danger of collision occurring in this case, the signal output to the driver or perhaps an automatic regulating or control intervention, as the case may be, may take place relatively late. Consequently, the lane change by an object is first reliably detected when it is already underway, and the measurable variables differ markedly from the case of the normal continuation of travel.

Therefore, according to the present invention, the blinking signals of the other vehicles are sensed which already indicate the intention of a lane change, and thus, as a rule, are output prior to the actual lane change or at the beginning of the lane change.

In this context, there may be several seconds between the earliest possible video-based detection of the intention to change lanes and the earliest possible geometry-based detection of the lane change; according to the present invention, these seconds may be utilized by a driver-assistance function for intervening in a vehicle system, particularly a braking system, engine-management system or perhaps steering system and, if appropriate, additionally for the display of information signals and/or warning signals to the driver.

In this connection, it is recognized that blinking signals sent out by the further, especially preceding vehicles differ markedly in their blinking frequency and pulse duration from further actions of light possibly occurring, particularly from the actuation of brake lights and light reflections on vehicles or other objects. In this context, according to the present invention, it is advantageous that the blinking frequency and pulse duration for vehicles to be found on the road differ only slightly these days from a predefined standard, and thus limiting values may be predefined for the blinking frequency and pulse duration to ascertain a blinking process. Sun reflections on the window of an object and other light reflections may thus be ruled out, as well.

In addition, braking lights of preceding vehicles may also be detected, and thus the present and anticipated driving behavior of these vehicles, ascertained from the flasher signals and braking signals, may be taken into account.

As a result of the sensing and ascertainment, automatic braking actions of the host vehicle or ego vehicle, as well as interventions in the engine-management system, particularly the prevention or limiting of an acceleration in the event a possible collision is detected and, if appropriate, steering interventions may be output, as well. Furthermore, brakings targeted to detected obstacles, e.g., the end of a traffic jam, may be initiated. In addition, according to the present invention, wireless signals, e.g., radio signals or infrared signals, may also be output by the host vehicle for use by traffic management systems and/or for the direct information of further vehicles.

The present invention recognizes to particular advantage that it is possible to differentiate between a direction-change blinking and a warning blinking with surprisingly little effort by checking whether the blinking is synchronous or simultaneous in the two lateral regions of the detected preceding vehicle in which the two turn-signal lights are most likely located. Thus, according to the present invention, depending upon the detection as to whether no blinking signal, a direction-change blinking signal or a warning blinking signal is present, different signals for different information may be output to the user and/or different vehicle interventions may be implemented.

Furthermore, it is possible to ascertain a driving path on which the host vehicle will subsequently be located at the present or planned velocity, and to compare it to the ascertained present and anticipated driving conditions of the preceding vehicles, so that the control signals and information signals are output as a function of this comparison.

Position information of the host vehicle, for example, from a GPS, as well as road-map information may also be utilized. In this case, for example, an ascertained direction change may also be assigned to a turning event onto an ascertained road forking off into the corresponding direction.

DETAILED DESCRIPTION OF THE INVENTION

Figure 1:
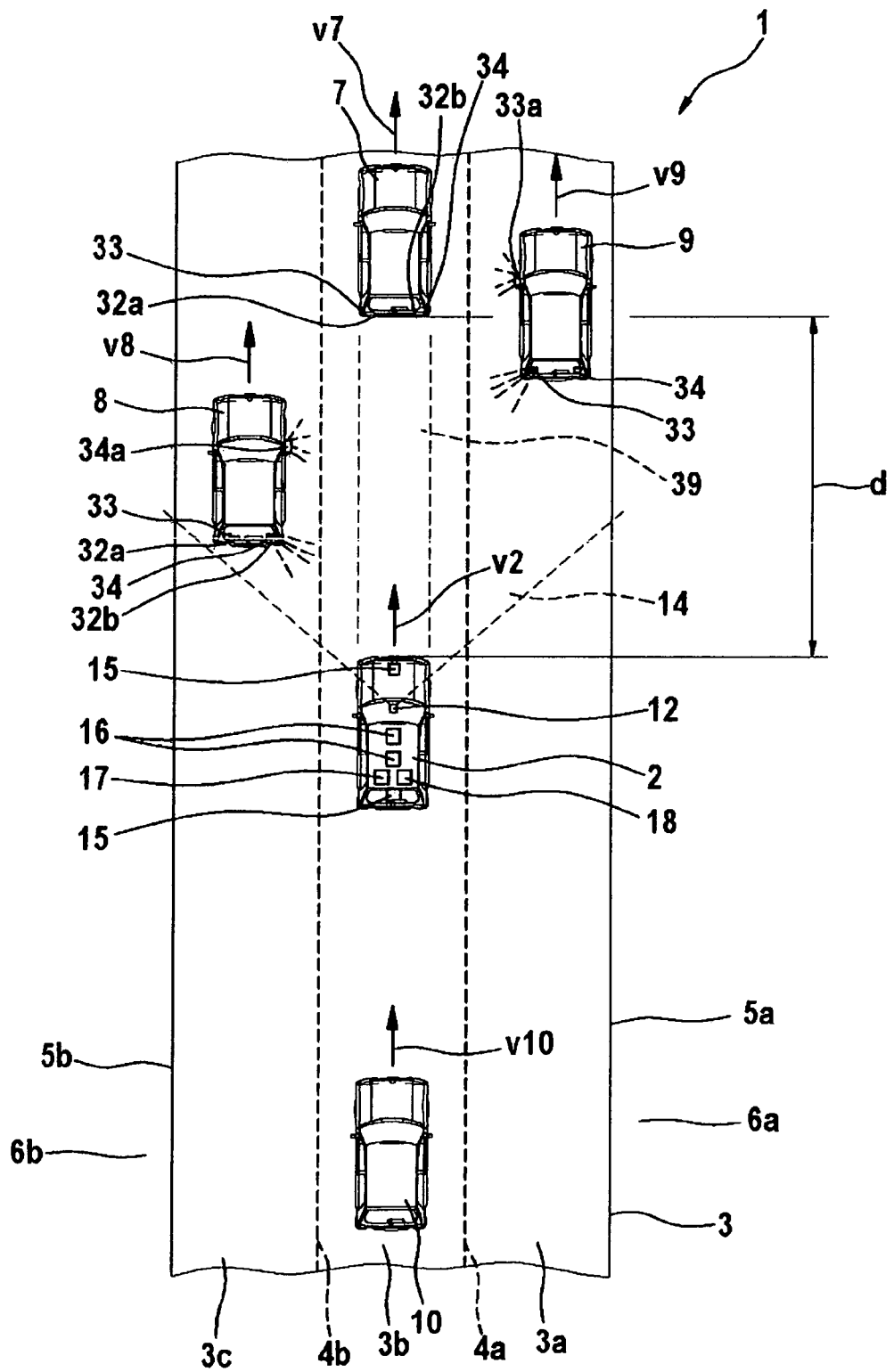
FIG. 1 shows a plan view of a road scene having a vehicle according to the present invention.

FIG. 1 shows a road scene 1, in which a vehicle 2 according to the present invention is driving in center lane 3b of a three-lane roadway 3 with velocity v2. The roadway also has a right lane 3a and a left lane 3c, which are separated from the center lane by broken-line lane markings 4a and 4b, and to the outside are separated from a right and left outer surrounding area 6a, b by solid lane markings 5a, b.

As an alternative to road scene 1 shown, for instance, right lane 3a may also form the emergency stopping lane, in which case roadway marking 4a would then be solid. For instance, traffic signs 11, stationary vehicles as well as further objects 39 like houses and trees may be present in surrounding areas 6a, b. To the left of left surrounding area 6b, in particular, there may be an opposite lane, which is not further considered here.

In road scene 1 shown, vehicle 2 is traveling with a velocity v2. In front of it, a further vehicle 7 is traveling with a velocity v7. At an angle in front of it, a further vehicle 8 is traveling in left lane 3c with velocity v8, and correspondingly, a further vehicle 9 is traveling in right lane 3a with velocity v9; if right lane 3a is an emergency stopping lane, in general, vehicle 9 will be stationary with a velocity v9=0, or in the case of a stopping or starting procedure, will also be traveling with a low velocity v9. Behind vehicle 2, a further vehicle 10 is traveling with velocity v10 in the same lane 3b.

Vehicle 2 of the present invention has a camera 12 which, with a coverage area 14, basically covers road scene 1 in front of vehicle 2, particularly lanes 3a, b, c and possibly surrounding areas 6a, b, as well. In addition, vehicle 2 advantageously has one or more further driving-environment sensors 15, particularly a distance sensor 15, e.g., a radar sensor, lidar sensor, range-video sensor, PMD (photonic mixer device) sensor and/or ultrasonic sensor which sense road scene 1 or partial areas of road scene 1, and, optionally, a sensor for the condition of the road. Driving-environment sensors 15 may also sense road scene 1 outside of coverage area 14, for example, also to the side of vehicle 2 as well as to the rear.

In general, vehicle 2 further has one or more intrinsic-state sensors 16 which, in particular, sense driving velocity v2 of the host vehicle, wheel speeds n, longitudinal acceleration a, a yaw rate ω about the vertical vehicle axis, possibly also the pitch rate about the transverse axis and the roll rate about the longitudinal axis, as well as accelerations, e.g., a lateral acceleration q. Moreover, for example, vehicle 2 may have a position-determining device 17, e.g., a GPS receiver 17 with a corresponding control device, possibly also a digital map 18 that is stored or received via long-distance data transmission.

In a manner known per se, vehicle 2 also has one or more vehicle-dynamics control systems, for example, a brake-control system such as ABS and/or a vehicle-dynamics program such as ESP, as well as, optionally, engine-management control systems. Accordingly, a plurality of control devices may be provided in vehicle 2.

Furthermore, vehicle 2 has a longitudinal control and possibly also a lateral control, particularly a distance-control system, e.g., an adaptive distance-control system such as ACC which regulates distance d to preceding vehicle 7.

Figure 2:
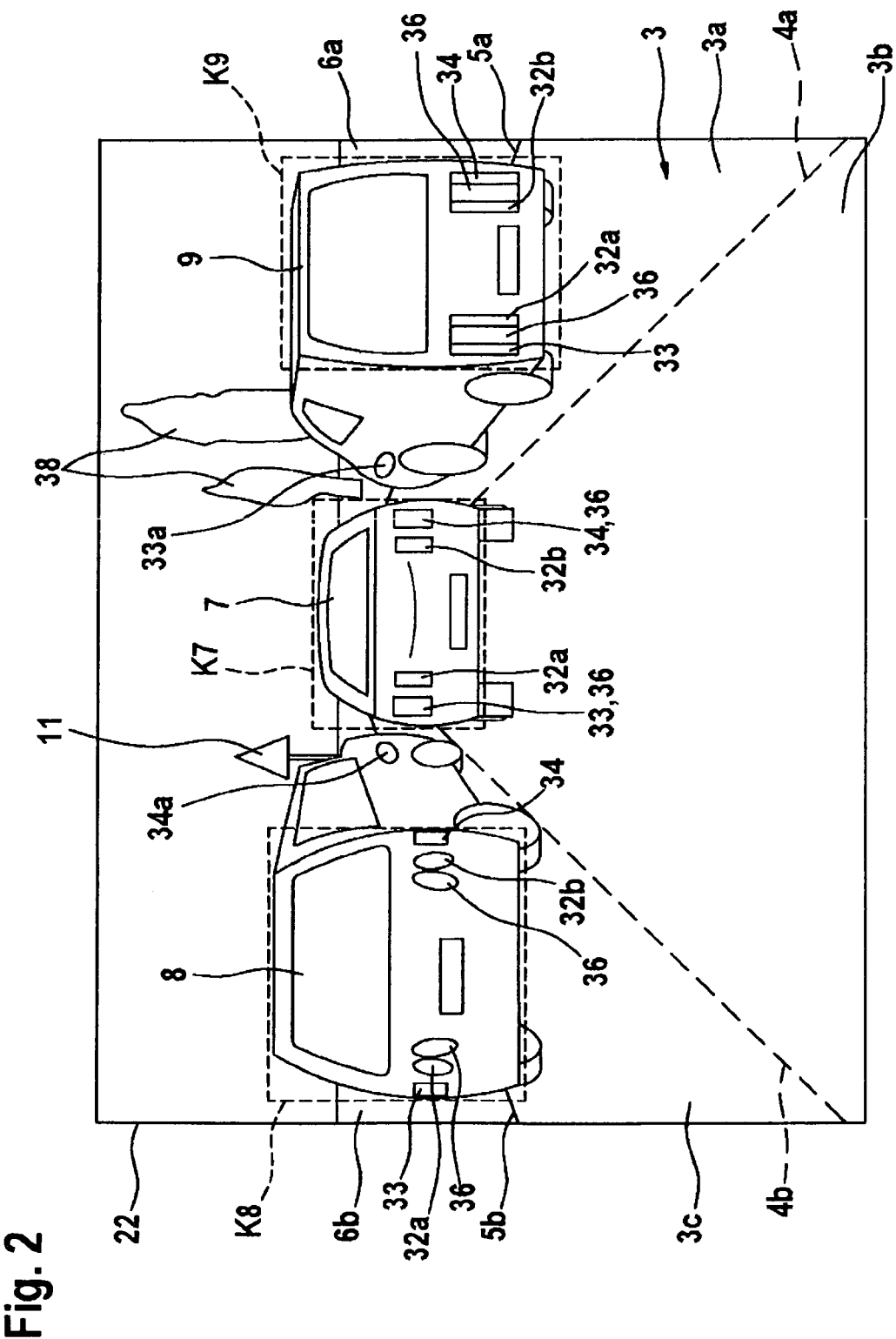
FIG. 2 shows the image picked up by the camera of the vehicle in FIG. 1.

FIG. 2 shows image 22 taken by camera 12, in which traffic lanes 3a, 3b, 3c, vehicles 7, 8, 9 and lane markings 4a, 4b are picked up.

Figure 3:
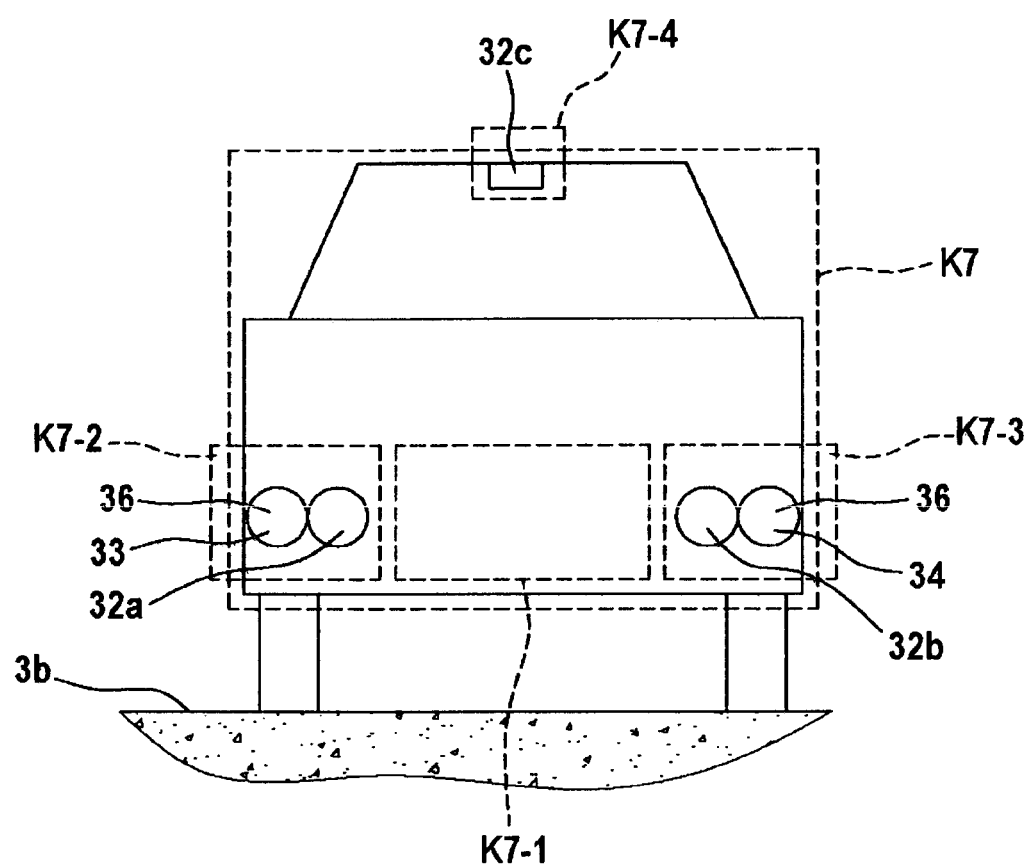
FIG. 3 shows a representation of an image detection to recognize a vehicle in FIG. 2 and its relevant partial areas.

According to the present invention, an object-recognition algorithm is executed in which vehicles 7, 8, 9 are recognized as objects in image 22. Recognition algorithms of this type are familiar as such; in particular, they include an edge detection, in order to realize the sensed vehicles as area, especially area with rectangular shape. This takes place particularly in the dynamic image. In this context, vehicles 7, 8, 9 or their chassis area are in each case sensed and recognized as an essentially rectangular object which moves in unified fashion. Thus, in FIGS. 2 and 3, areas K7, K8, K9 marked with broken lines are placed on vehicles 7, 8, 9.

At their rear or back side, vehicles 7, 8, 9, in a manner known per se, have a left and right brake light 32a, 32b, as well as a left turn-signal light 33 and a right turn-signal light 34. If applicable, for the oblique coverage of vehicles 8, 9 in image 22, a turn-signal light 33a and 34a, respectively, provided laterally on the vehicle, may also be picked up. In addition, taillights 36 of the vehicles are also recorded in image 22.

According to the present invention, areas K7, K8, K9 are subdivided into partial areas in order to be able to pinpoint light sources 32a, 32b, 33, 34, and thus to be able to ascertain their signal output. This is shown in FIG. 3 for vehicle 7 with lower middle partial area K7-1, lower left partial area K7-2 for left turn-signal light 33 and left brake light 32a and lower right partial area K7-3 for right turn-signal light 34 and right brake light 32b. Additionally, for example, an upper middle partial area K7-4 may be formed for any existing third brake light 32c. In this connection, the partial areas applied may also overlap in order to account for the relevant light sources with great reliability; furthermore, unlike as shown in FIG. 3, middle partial area K7-1 may also be wider than the outer partial areas. In particular, taillights 36 may be both in lower middle partial area K7-1 and in lower outer partial areas K7-2 and K7-3. Furthermore, different light signals may also be generated by one common light source as shown in FIG. 2 in the case of vehicle 7 where turn-signal lights 33 and 34 are each configured together with one taillight 36 as one light source, e.g., bulb or LED array. If a vehicle, e.g., vehicle 9 is sensed at an angle or in perspective, its left front turn-signal light 33a provided laterally on the vehicle may consequently be detected somewhat to the left beside turn-signal light 33, and thus in a further partial area or in extension of the left lower partial area.

An exact detection of individual light sources 32a, 32b, 33, 34 and possibly their differentiation from one another and from taillights 36 takes place subsequently during the object detection and image processing, respectively.

Advantageously, further objects may also be recognized in image 22, especially lane markings 4a, 4b as well as 5a, 5b, possibly also objects 11 alongside roadway 3, and may be utilized for the method of the present invention.

Figure 4:
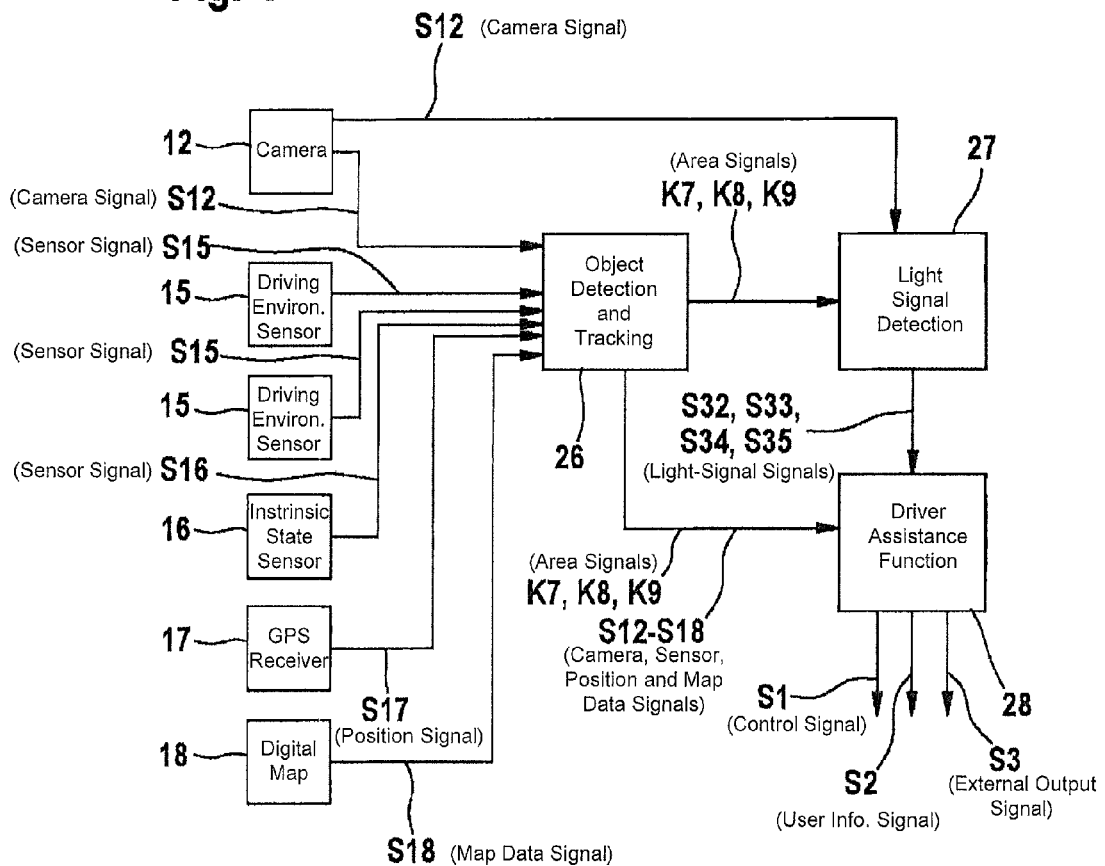
FIG. 4 shows a block diagram of a detection and control device according to the present invention.

The signal reception, object detection and object tracking are described in greater detail in the block diagram in FIG. 4. The object detection and object tracking are realized in block 26 using the recognition algorithm, for which signals S12, S15, S16 from camera 12, driving-environment sensors 15 and intrinsic-state sensors 16, possibly also position signals S17 from GPS receiver 17 and map data S18 of digital map 18 are utilized. In block 27, the light signals of objects 7, 8, 9 ascertained in block 26 are detected. In this context, in particular a spatial and a temporal/frequency-wise, possibly also a spectral analysis and evaluation are carried out.

In the spatial analysis or differentiation, sensed objects 7, 8, 9 are each considered spatially resolved into partial areas, e.g., K7-1 through K7-4. The detected light sources or signal sources are thereby already able to be assigned to the specific lateral position, that is, left or right, so that, for example, detected turn-signal lights 33, 34 and brake lights 32 a, b, and, if applicable, taillights 36, as well, are each assigned to one lateral area of respective objects 7, 8, 9. In so doing, according to the present invention, advantageously at first only a differentiation into left, middle and right is carried out, since the exact position of the various light sources may be at different heights for different vehicle types, for example, in a lower area of the bumper, or perhaps further up, next to the window. Furthermore, because of the relative spatial arrangement, advantageously no differentiation is made according to the type of light sources, that is, no distinction is made between turn-signal light, brake light and taillight, since according to the invention, it is recognized that they may also be realized in one bulb or in the same LED array in the case of different types of vehicles.

Additionally, a color distinction may also be implemented, in order to differentiate red taillights 36 and red brake lights 32a,b from orange or yellow turn-signal lights 33, 34.

Moreover, to ensure a possibly existing brake light and/or turn-signal light, symmetrical properties such as the same height above roadway 3 or the same distance of the two opposite brake lights 32a, 32b and also of the two opposite turn-signal lights 33, 34 to the center of the vehicle are utilized.

According to the present invention, it is further recognized that turn-signal lights 33, 34 and, optionally, 33a, 34a may be differentiated from brake lights 32a,b and taillights 36 based on their behavior over time. Therefore, in the present invention, the behavior of ascertained signal lights 32a, b, 33, 34 and taillights 36 is evaluated or analyzed over time, so that blinking of turn-signal lights 33, 34 may be recognized with certainty, and thus these turn-signal lights 33, 34, 33a, 34a may be differentiated from brake lights 32a,b and taillights 36. This analysis is combined with the subdivision of areas K7, K8, K9 into their partial areas.

The direction indication left or right, that is, directional-blinking signal S33 of left turn-signal light 33 or blinking signal S34 of right turn-signal light 34 may also be differentiated from each other by considering the different partial areas K7-2 and K7-3 in area K7 of detected object 7. Since the blinking frequency and the pulse duration for a turn-signal light are constant and are also standardized within predefined limiting values, according to the present invention, it is checked whether a constant blinking frequency and a constant pulse duration of an object 7, 8, 9 in one of its lower outer partial areas may be recognized as blinking signal of a turn-signal light 33, 34.

Thus, in the present invention, the blinking signals are also able to be differentiated from other light phenomena that are variable over time, such as light reflections on the window of an object or on roadway 3 or other objects, which do not exhibit a constant blinking frequency and pulse duration.

A lighting-up of brake lights 32a, 32b and possibly 32c is recognized as brake signal S32, which does not change with constant blinking frequency and pulse duration, but should change during longer object tracking. In this context, a change in intensity or variable pulse sequence may also be assigned to a brake signal S32, since in newer vehicles, the braking pressure and thus the braking action are often indicated by the intensity and/or frequency of the pulse sequence, the pulse sequences being output at frequencies in the range below one tenth of a second, for example, and thus markedly below the blinking frequency. Therefore, according to the present invention, brake signal S32 ascertained with respect to a detected vehicle may include not only the indication "braking action on/off", but possibly also a signal value with a range indication that may be utilized in the invention.

Furthermore, in the present invention, it is recognized that blinking of only one turn-signal light 33 or 34 as direction indication and thus directional-blinking signal S33 or S34 may be differentiated from both turn-signal lights 33, 34 blinking together. If synchronous blinking of both lateral turn-signal lights 33, 34 is recognized, a hazard-warning signal S35 is decided upon in block 27. Thus, the blinking signals "lane change to the right," "lane change to the left" as well as a hazard-warning signal may be differentiated from each other.

In block 28 of FIG. 4, a driver-assistance function is subsequently carried out based on recognized objects 7, 8, 9 or areas K7, K8, K9 representing them, as well as ascertained light signals S32, S33, S34 of objects 7, 8, 9. In so doing, it is possible to intervene directly in the operating behavior or operating dynamics of vehicle 2 via control signals S1 which influence the braking performance and/or engine management. The driver-assistance function may include a longitudinal control and lateral control or a lane-keeping-assistance program including a distance control, e.g., ACC, for maintaining distance d. Moreover, according to the invention, user-information signals S2 may be output to the driver of vehicle 2, as described hereinafter. User-information signals S2 may be visual, acoustic and/or haptic signals.

Blocks 26, 27, 28 thus also form a control device for carrying out the method of the present invention or a control device for a driver-assistance system of a vehicle 2 of the present invention.

As intervention in the driving condition, in particular, vehicle 2 may be decelerated automatically in response to the recognition of dangerous situations. Interventions in the engine management to prevent, reduce or increase an acceleration are also possible. Automatically implemented interventions in the steering of the vehicle are possible, as well; in this context, a change of traffic lane from 3b to 3a or 3c may also be initiated automatically, particularly by electrical or hydraulic actuators. Moreover, external output signals S3, especially warning signals, may be output by vehicle 2 to vehicle 10 to the rear, for example, as well as possibly to further vehicles 7, 8, 9.

Situations recognizable according to the present invention are, in particular:

An intended lane change by one of vehicles 8 or 9 traveling in front of vehicle 2 from an adjacent lane 3a or 3c to lane 3b of the host vehicle is recognized. This may take place upon detection of the actuation of right turn-signal light 34 of vehicle 8 in lane 3c adjacent to the left or the actuation of left turn-signal light 33 of vehicle 9 in lane 3a adjacent to the right. In this case, it is recognized that a possible collision of vehicle 2 with vehicle 8 or 9 changing lanes may take place if the lane change indicated by vehicle 8 or 9 in question is actually carried out. In this case, the following reactions may be implemented:

1. The output of a user-information signal S2 to the user, e.g., as a visual, acoustic or haptic signal, in order to indicate to him/her the possibly imminent necessity of an intervention, or perhaps an automatic intervention already carried out or subsequently initiated, in the vehicle control system.
2. Automatic deceleration of vehicle 2 or initiation of a braking routine of the vehicle-dynamics system. In this connection, for example, a braking process with a suitable braking action may be introduced.
3. Influencing the acceleration of the vehicle-dynamics system. In so doing, in particular, an acceleration planned or input by the driver or carried out automatically by the vehicle-dynamics system may be reduced or completely altered. This measure is based on the knowledge that the driver of vehicle 8 or 9 indicating the planned lane change has not taken acceleration 2, possibly not yet carried out by vehicle 2 but planned, into account in his indicated lane change.
4. Calculating an alternative vehicle behavior or further measures. Here, for example, based on sensor signals S15 of driving-environment sensors 15, it may be checked whether the host vehicle has an evasion possibility in the event vehicle 8 or 9 actually swings into its own lane 3b. Furthermore, a possible braking performance may be taken into account by measuring the distance rearward to rear vehicle 10, since at this point, a collision could perhaps take place if rapid braking is introduced.
5. Output of a warning signal S3 to vehicle 8 or 9 in question, which indicates the lane change recognized as dangerous. This may be accomplished by an acoustic signal output, e.g., blowing the horn, a visual signal output, e.g., actuation of a headlight flasher to the front or, in the event there is a data link, e.g. radio link, to vehicle 8 or 9, by the output of a suitable warning signal or blockade signal. Thus, an automatic return warning takes place from vehicle 2 to jeopardizing vehicle 8 or 9 or its driver, particularly if the evaluation of the position and movement data of vehicle 2 and of vehicle 8, 9 shows that a significant danger of collision is associated with the indicated lane change of vehicle 8 or 9.
6. Automatic warning or indication to further road users, especially vehicle 10 to the rear, possibly also other vehicles, particularly also to further vehicle 9 or 8 not signaling in the event it would likewise be affected by the indicated lane change, if it is recognized that a further road user must or should likewise react to the traffic situation which has occurred or is imminent. Thus, if vehicle 8 indicates a lane change to the right, and if a lane change to the right thereby forced upon host vehicle 2 could draw further vehicle 9 into a possible collision, this determined danger situation may be indicated to further vehicle 9 as warning signals S3. In particular, according to the present invention, a possibly imminent brake intervention, especially an emergency braking, may be indicated to following vehicle 10, particularly by actuation of the rear brake lights of host vehicle 2.

If, in the case of front vehicle 7 located in lane 3b in front of host vehicle 2, a lane change is recognized by the blinking of a turn-signal light 33 or 34 on one side, the following reactions are possible and may be offered or carried out automatically as a function of ascertained distance d to vehicle 7 and ascertained velocities v2 and v7:

1. Acceleration of host vehicle 2 earlier on, particularly via the longitudinal and lateral control system, e.g., ACC system, if at the same time, due to the evaluation of the position and movement data of vehicle 7 and of host vehicle 2 as well as the progression of lane markings 4a and 4b, it may be predicted with high probability that further vehicle 7 will have left driving path 39 of the intended travel motion of the host vehicle ascertained as distance/time function.
2. Output of a user-information signal Sa to offer to the user the choice either to continue to follow signaling vehicle 7 as target object, or to remain in present lane 3b. In particular, this may take place if an automatic distance control or driving in convoy is being carried out at present.
3. Deceleration of vehicle 2 or its vehicle dynamics system if it is recognized or it is probable that vehicle 7 is signaling the lane change because an obstacle, e.g., a slowly moving object, is located in front of it. Here, if applicable, the recognition of a further object in front of front vehicle 7 may be amplified if, for example, by reflection on roadway surface 3 next to or beneath front vehicle 7, the beams of a radar sensor 15 indicate a larger obstacle and/or, because of its size, a larger obstacle, e.g., a truck, is able to be identified by camera 12 or a further camera in front of smaller vehicle 7.
4. Deceleration of host vehicle 2, i.e., deceleration via the vehicle dynamics system, if it is recognized that there is a high possibility or even certainty that front vehicle 7 will reduce its velocity v7 prior to the intended lane change or an intended turn.

Case 4 may occur especially if the traffic in adjacent lane 3a or 3c is moving more slowly or a sufficiently large gap for vehicle 7 will only open up later. In this context, in principle, an evaluation of this traffic in adjacent lane 3a or 3c is possible via driving-environment sensors 15 of vehicle 2.

Case 4 may also include the detection of the existence or absence of an adjacent lane 3a or 3c, e.g., by detecting the existence or non-existence of lane markings 4a or 4b, or detection of a lane marking 5a or 5b which does not allow a lane change, or by detecting traffic signs 11 or further stationary objects 38 such as trees, so that vehicle 7 will probably make a turn, stop or turn back. In particular, this case may also be concluded utilizing digital map 18 and possibly navigation data S17 of GPS system 17, that is, position information of the host vehicle.

According to the invention, in addition to hazard warning signal S35 of further vehicle 7, 8 or 9, in general, further hazard warning lights of commercial vehicles, e.g., police, emergency, ambulance and fire vehicles, tow trucks, snow-removal vehicles, heavy-duty transporters and/or construction-site vehicles are also able to be detected in block 27. In the present invention, they may be differentiated from the hazard warning light of a vehicle 7, 8, 9 since, for example, the hazard warning lights of such commercial vehicles are especially bright, possibly also colored, e.g., blue or orange. Furthermore, in some instances, a deviation of the flashing frequency and/or pulse duration from the predefined values of a normal vehicle 7, 8, 9 may be detected. Optionally, by evaluating the image of FIG. 2 or 3, it may also be recognized whether the lights are not flashing symmetrically at the sides of the recognized vehicle, but rather, for example, at least one further light is disposed on the vehicle roof.

According to the present invention, breakdown warning lights, which are put on roadway 3 or at the edge of the roadway or surrounding area 6a or 6b, as well as construction-site warning lights are also able to be detected, even though they are not assigned to a recognized vehicle.

In response to the detection of a hazard warning signal S35 in the case of a vehicle 7, 8 or 9 or perhaps one of the other warning lights named, the following reactions are possible according to the present invention:

1. Automatic activation of the hazard warning light system of the host vehicle by a control signal S1, that is, synchronous activation of turn-signal lights 33, 34 of host vehicle 2, in order to warn further, especially following traffic. For instance, this may always be carried out when, in addition, brake lights 32a, b of a front vehicle 7, 8 9 are detected and/or hazard warning signals S35 of a plurality of vehicles 7, 8, 9 are ascertained.
2. Influencing the engine management, especially influencing, preferably preventing an acceleration of vehicle 2 or its vehicle-dynamics control system.
3. Deceleration of vehicle 2.
4. Initiating a braking targeted toward the detected obstacle, e.g., front vehicle 7. In particular, this may take place automatically upon recognition of a high velocity differential of v2-v7, that is, when the velocity differential v2-v7 exceeds a threshold value, predefined or determined from the environmental conditions, which in particular also takes ascertained distance d into account, since at this point, an accident or traffic jam may be assumed.
5. Output of an external output signal S3, e.g., a radio signal or infrared signal, for use by traffic management systems.

Moreover, if brake lights 32a, b are detected on preceding vehicle 7, the following reactions are possible:

1. Determining the relevance of ascertained object 7, 8, 9 for the continuation of travel by the host vehicle. Thus, the ascertained driving path of the host vehicle is compared to the ascertained driving path of the object. In so doing, the probability with which object 7, 8, 9 is or will be in the driving path of the host vehicle may be determined in particular.
2. Influencing the acceleration of the distance-control system, especially preventing or limiting an acceleration.
3. Deceleration of the distance-control system, that is, host vehicle 2.
4. Initiating a braking targeted, for example, to a braking vehicle.
5. Automatic or self-operating activation of the hazard warning light system, i.e., turn-signal lights 33, 34 at the front and rear of the host vehicle in order to warn the following traffic, for example, when a stronger influencing of the following traffic is to be expected based on a multitude of brake lights lighting up.

In the block diagram of FIG. 4, blocks 26 and 27 may be formed by separate devices, or perhaps by one common control unit.

According to the invention, ascertained directional blinking signal S33, S34 or S35, or perhaps brake signal S32 may be used to detect an object which, until then, was not yet recognized. In this case, blocks 26 and 27 form one common block.

According to the invention, particularly in addition to or as part of the driver assistance function of block 28, a vehicle dynamics control, known per se, is carried out using signals S15, S16 of driving-environment sensors 15 and intrinsic-state sensors 16, as well as position signals S17 and map data S18, which is not further discussed here.

What is claimed is:

1. A method for assisting a user of a first vehicle, comprising:
    imaging a coverage area of a road scene at least in front of the first vehicle using a camera of the first vehicle and outputting image signals;
    sensing, by at least one sensor, driving-condition variables which describe a driving condition of the first vehicle;
    ascertaining, by at least one computer processor, a driving path which represents an anticipated distance and time function of the first vehicle in a present driving condition of the first vehicle;
    determining, by the at least one computer processor, whether a further vehicle which is outputting light signals is in the coverage area, based on the image signals;
    in a case of a positive result of the determining, further determining, by the at least one computer processor and from at least one of a blinking frequency and a pulse duration of the light signals, whether the further vehicle is indicating a change of direction;
    in a case of a positive result of the further determining, ascertaining, by the at least one computer processor, whether the further vehicle indicating the change of direction will enter or leave the ascertained driving path with the change of direction; and
    outputting, by the at least one computer processor, at least one output signal as a function of the driving-condition variables of the first vehicle, the determination as to whether the further vehicle is indicating a change of direction, and the ascertainment of whether the further vehicle, when changing direction, will enter or leave the ascertained driving path.

2. The method as recited in claim 1, wherein an automatic driver-assistance control is carried out, and control signals for interventions in a vehicle control for at least one of longitudinal and lateral control are output as output signals.

3. The method as recited in claim 2, wherein the first vehicle measures a distance to at least one vehicle in front, and the driver assistance control includes a distance control method for adjusting the distance.

4. The method as recited in claim 1, wherein information signals to at least one of a visual display device user interface and an acoustic or haptic output device user interface are output as output signals.

5. The method as recited in claim 4, wherein the information signals indicate at least one ascertained further possible intervention in the driving condition of the first vehicle as an input prompt.

6. The method as recited in claim 4, wherein warning signals are output as information signals in response to recognition of a dangerous situation.

7. The method as recited in claim 1, wherein external output signals to at least one of the further vehicle and a traffic management system external receiver are output as output signals.

8. The method as recited in claim 1, wherein at least one of a control signal for an engine management to increase the acceleration and an information signal to indicate an acceleration to be carried out is output.

9. The method as recited in claim 1, further comprising:
ascertaining whether both lateral turn-signal lights of the further vehicle are blinking synchronously or only one of the lateral turn-signal lights is blinking;
if synchronous blinking of both lateral turn-signal lights is ascertained, a hazard warning blinking is recognized and a hazard warning blinking light signal is output; and
if only one lateral turn-signal light is ascertained, a directional blinking indicating a change of direction is recognized and a directional blinking signal is output, and the output signal is output as a function of the ascertainment of the blinking state.

10. The method as recited in claim 1, wherein at least one of brake signals and blinking signals are also ascertained from the image signals in image areas in which no vehicle is detected, and at least one additional vehicle is subsequently assigned to the brake signals or blinking signals ascertained from the image signals in image areas in which no vehicle is detected.

11. The method as recited in claim 1, wherein the further vehicle is ascertained from the image signals by a pattern-recognition method, with aid of segmentation and edge extraction.

12. The method as recited in claim 11, wherein the further vehicle determined from the image signals is ascertained using geometrical regions, including at least one of areas and partial areas to which a high probability for a presence of a brake light or a turn-signal light is assigned.

13. The method as recited in claim 1, wherein brake lights, turn-signal lights and taillights are differentiated in the image signals based on a spectral composition or color of the light signals.

14. The method as recited in claim 1, wherein light sources in the image signals are differentiated as brake lights, turn-signal lights and taillights based on a signal behavior of the light signals over time.

15. The method as recited in claim 14, wherein a light source is recognized as turn-signal light if the light source exhibits a periodic signal behavior over time with constant pulse duration and pulse frequency within predefined values.

16. The method as recited in claim 14, wherein a light source is recognized as brake light if the light source exhibits a variable signal behavior over time with non-periodic signal change or a rapidly pulsed signal behavior with higher frequency than a predefined blinking-pulse frequency.

17. The method as recited in claim 16, wherein a different braking action of the recognized vehicle is assigned to a recognized braking-pulse frequency or a variable signal strength of the recognized brake light.

18. The method as recited in claim 1, wherein in response to a detected direction-change blinking, at least one of map-data signals and position data are utilized to ascertain whether there is a high probability that the further vehicle will turn.

19. The method as recited in claim 1, wherein the driving-condition variables are also ascertained from the image signals of the camera.

20. A method for assisting a user of a first vehicle, comprising:
imaging a coverage area of a road scene at least in front of the first vehicle using a camera of the first vehicle and outputting image signals;
sensing, by at least one sensor, driving-condition variables which describe a driving condition of the first vehicle;
determining, by at least one computer processor, whether a further vehicle which is outputting light signals is in the coverage area, based on the image signals;
in a case of a positive result of the determining, further determining, by the at least one computer processor, from at least one of a blinking frequency and a pulse duration of the light signals, whether the further vehicle is indicating a change of direction; and
outputting, by the at least one computer processor, at least one output signal as a function of the driving-condition variables of the first vehicle and as a function of the determination as to whether the further vehicle is indicating a change of direction;
wherein, when a brake light or a directional blinking of one turn-signal light of the further vehicle is detected and that there is a high probability of a collision with the further vehicle is ascertained, a braking procedure of the first vehicle is ascertained and at least one of a control signal for an automatic brake intervention and an information signal for indication to the user is output by the at least one computer processor; and
wherein, when a brake light or a directional blinking of one turn-signal light of the further vehicle is detected and that, because of the change in the driving condition of the further vehicle, there is a high probability that a driving condition of a third vehicle will be altered is ascertained, and thus there is a high probability for a collision with the third vehicle or another object, a braking procedure of the first vehicle is ascertained and at least one of a control signal for an automatic brake intervention and an information signal for indication to the user is output by the at least one computer processor.

21. The method as recited in claim 20, wherein a braking is ascertained targeted to another vehicle or another object, and the output signal is output for the targeted braking.

22. A method for assisting a user of a first vehicle, comprising:
imaging a coverage area of a road scene at least in front of the first vehicle using a camera of the first vehicle and outputting image signals;
sensing, by at least one sensor, driving-condition variables, which describe a driving condition of the first vehicle;
determining, by at least one computer processor, whether a further vehicle which is outputting light signals is in the coverage area, based on the image signals;
in a case of a positive result of the determining, further determining, by the at least one computer processor, from at least one of a blinking frequency and a pulse duration of the light signals, whether the further vehicle is indicating a change of direction;

outputting, by the at least one computer processor, at least one output signal as a function of the driving-condition variables of the first vehicle and as a function of the determination as to whether the further vehicle is indicating a change of direction;

wherein, when a brake light or a directional blinking of one turn-signal light of the further vehicle is detected and that there is a high probability of a collision with the further vehicle is ascertained, an evasion possibility is ascertained for the first vehicle by changing from a current lane of the first vehicle to an adjacent lane, and at least one of an information signal for indication to the user and a control signal for an automatic lane change is output by the at least one computer processor.

23. The method as recited in claim 22, wherein when a brake light or a directional blinking of one turn-signal light of the further vehicle is detected and that, because of the change in the driving condition of the further vehicle, there is a high probability that a driving condition of a third vehicle will be altered is ascertained, and thus there is a high probability for a collision with the third vehicle or another object, an evasion possibility for the vehicle by changing from a current lane of the first vehicle to an adjacent lane is ascertained, and the output signal is output.

24. A control device of a first vehicle that receives at least (a) image signals from a camera of the first vehicle, which image signals correspond to a coverage area of a road scene in front of the first vehicle, and (b) signals which describe driving-condition variables of the first vehicle, the control device configured for implementing a method for assisting a user of the first vehicle, the method comprising:

ascertaining a driving path which represents an anticipated distance and time function of the first vehicle in a present driving condition of the first vehicle;

determining whether a further vehicle which is outputting light signals is in the coverage area, based on the image signals;

in a case of a positive result of the determining, further determining, from at least one of a blinking frequency and a pulse duration of the light signals, whether the further vehicle is indicating a change of direction;

in a case of a positive result of the further determining, ascertaining whether the further vehicle indicating the change of direction will enter or leave the ascertained driving path with the change of direction; and outputting at least one output signal as a function of the driving-condition variables of the first vehicle, the determination as to whether the further vehicle is indicating a change of direction, and the ascertainment of whether the further vehicle, when changing direction, will enter or leave the ascertained driving path.

25. The control device as recited in claim 24, wherein the signals, which describe driving-condition variables of the first vehicle are received from intrinsic-state sensors of the first vehicle.

26. The control device as recited in claim 24, wherein signals are received from driving-environment sensors of the first vehicle.

27. A method for assisting a user of a first vehicle, comprising:

imaging a road scene using a camera of the first vehicle, wherein the road scene includes a further vehicle that is generating light signals;

determining, by at least one computer processor and based on at least one of a blinking frequency and a pulse duration of the light signals from the imaged scene, which of brake lights, turning lights, and hazard lights are the light signals; and outputting, by the at least one computer processor, at least one user warning or driving intervention signal as a function of the determination.

28. A vehicle control device configured to implement a method of assisting a user of the vehicle, the method comprising:

obtaining image signals corresponding to a road scene imaged by a camera of the vehicle, wherein the road scene includes a further vehicle that is generating light signals;

determining, based on at least one of a blinking frequency and a pulse duration of the light signals from the imaged scene, which of brake lights, turning lights, and hazard lights are the light signals; and outputting at least one user warning or driving intervention signal as a function of the determination.

\* \* \* \* \*

UNITED STATES PATENT AND TRADEMARK OFFICE
CERTIFICATE OF CORRECTION

PATENT NO.        : 8,615,357 B2                                                              Page 1 of 1
APPLICATION NO. : 12/735365
DATED             : December 24, 2013
INVENTOR(S)       : Stephan Simon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this
Twenty-second Day of September, 2015

Michelle K. Lee
*Director of the United States Patent and Trademark Office*